United States Patent Office 3,074,313
Patented Jan. 22, 1963

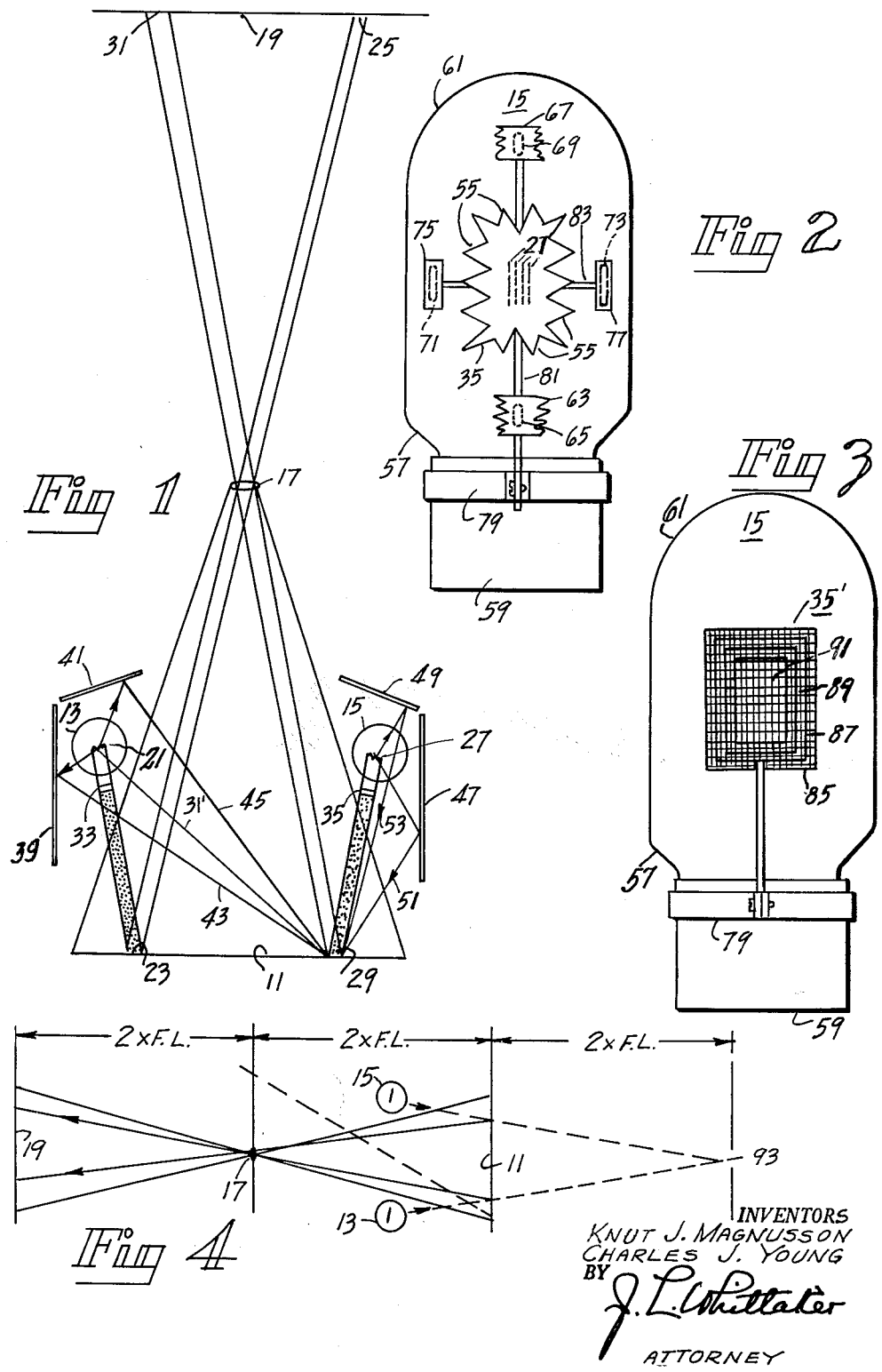

3,074,313
PHOTOCOPIER APPARATUS
Charles J. Young and Knut J. Magnusson, Princeton, N.J., assignors to Radio Corporation of America, a corporation of Delaware
Filed Dec. 27, 1960, Ser. No. 78,665
3 Claims. (Cl. 88—24)

This invention relates to photocopier apparatus and more specifically to improved lighting arrangements for use in reflection copiers.

In photocopier apparatus such as, for example, photostatic equipment, an original document to be copied is generally positioned on a plane surface. Light is projected onto the document and reflected therefrom through a lens and onto a photosensitive sheet. Heretofore, it has been customary to position the light lamps far enough to the side of the light path from the document to the lens so that light rays emanating from each source will strike the document at an angle greater than 45° with respect to the lens axis. If the light rays from a lamp were to strike a document which is glossy, or which is covered with a glass plate, at a more acute angle, bright spot reflections emanating from the lamp would be reflected from the document or glass through the lens and onto the photosensitive sheet resulting in bright spot exposure thereof in undesired areas. The most objectionable reflections which can be produced in photocopy apparatus will generally emanate from finite light sources such as, for example, a filament or an arc source within a glass envelope. Other objectionable reflections are also frequently produced in the glass envelope. The need for eliminating objectionable reflections has, theretofore, been an undesirable limitation in designing photocopy apparatus of reduced size.

An object of the invention is to provide an improved illumination source which combines improved uniformity of illumination with compactness of structure.

It is a further object of this invention to provide an improved photocopy lighting arrangement wherein undesired reflections and shadows are substantially reduced or eliminated.

It is still a further object to provide in reflection photocopy apparatus a compact lighting arrangement including means for substantially reducing or eliminating lamp filament or arc source reflections.

These and other objects and advantages are accomplished in accordance with a preferred embodiment of this invention which provides an unusually compact lighting arrangement for reflection photocopy apparatus. This lighting arrangement includes means for illuminating subject matter to be copied at an exposure station by at least one light lamp having a finite light source within a glass envelope. The lamp or lamps are positioned so that normally a bright image of the filament or arc source and, in some cases, bright spot reflections from the lamp envelope would be reflected from the subject matter being copied and would produce undesired bright spot exposure of any photosensitive material being employed. In the instant lighting arrangement, such difficulties are overcome by including at least one light baffle in the light path between the filament of the light lamp and the exposure station. The light baffle preferably has a substantially opaque center portion and gradually increasing light transmissivity outwardly from the center portion. In addition, one or more similar light baffles may be disposed to prevent bright reflections emanating from the envelope of the light lamp.

Normally one would expect that use of a light baffle, as called for herein, would cast a sharply defined shadow on the subject matter being copied, which would in turn prevent uniform exposure of a photosensitive sheet. It has been found, however, that with a baffle designed with radially graduated light transmissivity such as, for example, one having saw-tooth edges, substantial improvement is achieved in this regard. Further improvement can also be achieved by providing at least one additional light lamp and/or reflectors to illuminate any shadows which might be cast on the subject matter being copied.

Other objects and advantages are evident from the following detailed description illustrated in the drawings wherein:

FIG. 1 is a schematic plan view of a photocopier lighting arrangement in accordance with this invention;

FIG. 2 is an elevational view of a light lamp suitable for use in the apparatus of FIG. 1 having a plurality of light baffles attached thereto;

FIG. 3 is an elevational view similar to FIG. 2 and illustrating an alternative construction of a suitable light baffle; and FIG. 4 is a schematic illustration of a method for determining the proper location for the light baffles of FIG. 2.

Similar reference characters are applied to similar elements throughout the drawings.

In an embodiment of this invention as shown in FIG. 1 subject matter to be copied is positioned in an exposure plane 11 where it is illuminated by a pair of filamentary lamps 13 and 15. Light reflected from the exposure plane 11, is focused through a lens 17 onto a photosensitive surface positioned in a focal plane 19. Normally with the lamps 13 and 15 positioned as shown in FIG. 1, a bright image of the filament 21 of lamp 13 would impinge upon the exposure plane as at 23 and would be reflected therefrom through the lens 17 to cause overexposure in an area 25 at the focal plane 19. In a similar manner, the bright image of the filament 27 of the other lamp 15 would be reflected from the exposure plane at 29 to cause overexposure in an area 31 in the focal plane 19.

To obviate overexposure of areas such as 25 and 31 in the focal plane 19, a light baffle 33 is positioned between the filament 21 of lamp 13 and the exposure plane 11. In a like manner, a light baffle 35 is positioned between the filament 27 of the other lamp 15 and the exposure plane 11. Light baffles so positioned will cast shadows onto the exposure plane 11. For example, the baffle 35 will cast a shadow onto area 29 at the exposure plane 11 which could cause underexposure of the area 31 in the focal plane 19. Such underexposure is, to a large extent, eliminated by illumination of the area 29 in the exposure plane 11 by direct light from the lamp 13 as shown by the ray 31'.

Elimination of shadow effects as at area 29 can be further insured by the use of reflectors with each of the lamps 13 and 15. For example, associated with lamps 13 are two reflectors 39 and 41. Reflector 39 causes light to be reflected from the lamp 13 onto the area 29 as shown by the arrow 43. Reflector 41, in turn, causes reflected light to fall on the area 29 as shown by the arrow 45. Reflectors 47 and 49 also help illuminate the areas 29 with reflected light as shown by the arrows 51 and 53 respectively. Thus, with the lighting arrangement shown in FIG. 1, the bright images of the lamp filaments 21 and 27 are effectively screened out without producing any undue shadowing effects.

In order to further reduce shadowing effects, the baffle for each of the filaments 21 and 27 of FIG. 1 is constructed as shown in FIG. 2. The baffle 35 has an opaque center portion which screens the filament 27 of the lamp 15. The baffle 35 is provided with sawtoothed edges 55 whereby the light transmissivity of the baffle 35 is gradually increased from complete opacity at the center to full transmissivity at each edge. Were the baffle 35 to have been constructed, for example, as a completely opaque rectangle, sharp high-contrast shadow lines might be produced which would be extremely difficult to eliminate. With a baffle 35 having sawtooth edges as shown, no such shadow lines are created but rather a gradual contrast change is produced.

When an exposure lamp such as that illustrated in FIG. 2 is employed, additional light reflections emanate from the glass envelope. Generally, one such reflection will be caused by the sharp curve 57 of the envelope near the base 59 of the lamp. Another reflection will generally emanate from the sharp curve 61 of the envelope near the top of the lamp 15. Additional baffles can be provided to screen these light reflections. One such baffle 63 is shown near the base of the lamp 15 screening out a bright reflection 65. Another baffle 67 is shown near the top of the lamp 15 screening out a bright reflection 69. In general, it is preferred that these additional baffles 63 and 67 be constructed similarly to the filament baffle 35. However, should the light reflections 65 and 69 be small enough, they can be screened by means of solid rectangular baffles. Frequently, when two or more lamps such as that shown in FIGURE 2 are employed, light from one lamp will be reflected from the envelope of the other. Such light reflections are illustrated at 71 and 73. Since reflections of this type normally appear as bright thin lines they can generally be screened by thin rectangular opaque material, the baffles 75 and 77 being provided for this purpose.

Any of the baffles shown in FIGURE 2 could be provided by painting directly on the glass envelope of the lamp 15 with an opaque paint substantially in the configurations shown in the figure. In the alternative, the baffles may be mounted separate from the glass envelope of the lamp 15. Such an arrangement is depicted in FIGURE 2, wherein a collar 79 is provided around the base 59 of the lamp 15. The collar 79 supports a rod 81 on which three of the baffles 63, 27 and 67 can be slidably mounted. A cross arm 83 is also provided to support the two side baffles 73 and 75. With the construction shown in FIGURE 2, the baffles can be adjusted in one direction by sliding on a rod 81 and the cross arm 83 and in a second direction by slight bending of the rod 81 and the cross arm 83.

In FIG. 3 an alternative structure is illustrated for providing graduated light transmissivity for a filament baffle 35'. The baffle 35' comprises a first layer 85 of porous material such as, for example, 200 mesh metal screen, a second layer metal screen 87 is superimposed on the first layer 85, a third layer 89 superimposed on the second layer 87, and a fourth layer 91 on the layer 89. For the sake of simplicity only four such mesh layers are illustrated in FIG. 3. In actual practice it has been found that from 8 to 12 layers of 200 mesh screen are preferred. As is shown, each layer of screen gradually diminishes in size from the first layer 85 down to the center layer 91. By employing several layers as illustrated, the center portion of the baffle 35' covered by the last layer of screening 91 will be substantially opaque and the light transmissivity of the baffle 35' would gradually increase outwardly from the opaque center portion.

FIG. 4 illustrates a convenient method for determining the proper location of the light baffles depicted in FIG. 2. In this instance, the distance from the exposure plane 11 to the lens 17 is illustrated as being two focal lengths. The distance from the lens 17 to the focal plane 19 is also two focal lengths. Positioned outwardly from the exposure plane 11 at a distance of two focal lengths is an aperture 93. This aperture 93 is selected to have the same size opening as the lens 17. With the lamps 13 and 15 illuminated, observation thereof is made through the aperture 93. Bright images of the lamp filaments or reflections from the glass envelope can be readily observed through this aperture 93. Thus, for example, if one peered through the aperture 93 and observed a bright reflection such as 71 illustrated in FIG. 2, the baffle 75 could then be adjusted to insure that the light reflection 71 was screened out.

What is claimed is:

1. In reflection copier apparatus including means for supporting subject matter to be copied at an exposure station and means for projecting a reflected image of said subject matter onto a photosensitive surface, the combination comprising at least one light lamp including an envelope and a finite light source therein for illuminating said subject matter, said envelope having at least one portion forming a finite source of reflected light, and a plurality of light baffles interposed in the light path between said lamp and said exposure station, one of said light baffles being interposed between said light source of said lamp and said exposure station and having an opaque center portion and gradually increased light transmissivity outwardly from said center portion, and at least one other of said light baffles being disposed to intercept bright light reflected from the envelope of said lamp, mounting means positioning said other baffle between said portion of said envelope and said exposure station and adjusting means cooperating with said mounting means for accurately locating said other baffle between said finite source of reflected light and said exposure station.

2. In reflection copier apparatus including means for supporting subject matter to be copied at an exposure station and means for projecting a reflected image of said subject matter onto a photosensitive surface, the combination comprising at least two filamentary lamps for illuminating said subject matter, said lamps being spaced from said exposure station adjacent opposite sides thereof, and a plurality of light baffles each having an opaque center portion and gradually increased light transmissivity outwardly from said center portion, one of said light baffles being interposed between the filament of one of said lamps and said exposure station and another of said light baffles being interposed between the filament of the other of said lamps and said exposure station, each said lamp including an envelope having at least one portion forming a finite source of reflected light, each said lamp having associated therewith at least one additional baffle, mounting means positioning said additional baffle between said portion of said envelope and said exposure station and adjusting means cooperating with said mounting means for accurately locating said additional baffle between said finite source of reflected light and said exposure station.

3. The combination of claim 2 including reflector means for reflecting light from said lamps toward said exposure station.

References Cited in the file of this patent

UNITED STATES PATENTS

| | | |
|---|---|---|
| 413,611 | Clark | Oct. 22, 1889 |
| 1,617,292 | McCurdy et al. | Feb. 8, 1927 |
| 1,826,664 | Hopkins | Oct. 6, 1931 |
| 2,141,139 | Howe et al. | Dec. 20, 1938 |
| 2,356,694 | Potter et al. | Aug. 22, 1944 |
| 2,686,452 | Bentley | Aug. 17, 1954 |

FOREIGN PATENTS

| | | |
|---|---|---|
| 1,021,016 | France | Nov. 26, 1952 |